United States Patent
Foottit et al.

(10) Patent No.: US 9,332,135 B1
(45) Date of Patent: May 3, 2016

(54) SYSTEM, METHOD, AND COMPUTER PROGRAM FOR MANAGING A SHARED QUOTA FOR A PLURALITY OF NETWORK SUBSCRIBERS IN A CONSUMER TELECOMMUNICATIONS NETWORK

(71) Applicant: Amdocs Software Systems Limited, Dublin (IE)

(72) Inventors: Thomas Alexander Foottit, Stittsville (CA); Yong Li, Kanata (CA); Elizabeth Janet Keddy, Ottawa (CA)

(73) Assignee: Amdocs Software Systems Limited, Dublin (IE)

( * ) Notice: Subject to any disclaimer, the term of this patent is extended or adjusted under 35 U.S.C. 154(b) by 34 days.

(21) Appl. No.: 14/207,268

(22) Filed: Mar. 12, 2014

Related U.S. Application Data

(60) Provisional application No. 61/820,731, filed on May 8, 2013.

(51) Int. Cl.
*H04M 11/00* (2006.01)
*H04M 15/00* (2006.01)
*H04W 4/24* (2009.01)

(52) U.S. Cl.
CPC .......... *H04M 15/7652* (2013.01); *H04M 15/64* (2013.01); *H04M 15/66* (2013.01); *H04W 4/24* (2013.01)

(58) Field of Classification Search
CPC ..... H04M 15/66; H04M 15/64; H04M 15/00; H04M 15/58; H04M 15/7652; H04W 4/24
See application file for complete search history.

(56) References Cited

U.S. PATENT DOCUMENTS

| | | |
|---|---|---|
| 2012/0221899 A1 | 8/2012 | Cervenak et al. |
| 2012/0320801 A1* | 12/2012 | Yang ............... H04L 12/14 370/259 |
| 2013/0036032 A1* | 2/2013 | Cai ................. H04M 15/46 705/30 |
| 2014/0064151 A1* | 3/2014 | Shaik .............. H04M 15/64 370/259 |
| 2014/0066004 A1* | 3/2014 | Shaik .............. H04L 12/1407 455/406 |
| 2014/0187195 A1 | 7/2014 | Pallares Lopez et al. |

FOREIGN PATENT DOCUMENTS

WO    2012095697 A1    7/2012

OTHER PUBLICATIONS

Non-Final Office Action from U.S Appl. No. 14/207,280, dated Sep. 9, 2015.

* cited by examiner

*Primary Examiner* — Ajit Patel
(74) *Attorney, Agent, or Firm* — Zilka-Kotab, PC

(57) ABSTRACT

A system, method, and computer program product are provided for managing a shared quota for a plurality of network subscribers in a consumer telecommunications network. In use, an Sy interface session is established for a subscriber of a consumer telecommunications network, the Sy interface session being between a Policy and Charging Rules Function (PCRF) node and an Online Charging System (OCS) node of the consumer telecommunications network. Further, it is determined whether the subscriber is associated with any multi-subscriber shared usage counters on the consumer telecommunications network. Responsive to determining that the subscriber is associated with at least one multi-subscriber shared usage counter on the consumer telecommunications network, a reference to the at least one multi-subscriber shared usage counter is provided to the PCRF node by the OCS node. Additionally, the OCS node monitors the at least one multi-subscriber shared usage counter. Responsive to determining that a status of the at least one multi-subscriber shared usage counter has changed, a single Spending Status Notification Request (SNR) message is sent to the PCRF node, the single SNR message notifying the PCRF node that the status of the at least one multi-subscriber shared usage counter has changed. Responsive to the PCRF node receiving the single SNR message notifying the PCRF node that the status of the at least one multi-subscriber shared usage counter has changed, the PCRF node determines which open sessions on the consumer telecommunications network are associated with the at least one multi-subscriber shared usage counter. Furthermore, one or more policy changes to the open sessions are executed in accordance with the change to the at least one multi-subscriber shared usage counter.

20 Claims, 5 Drawing Sheets

SYSTEM, METHOD, AND COMPUTER PROGRAM FOR MANAGING A SHARED QUOTA FOR A PLURALITY OF NETWORK SUBSCRIBERS IN A CONSUMER TELECOMMUNICATIONS NETWORK

CLAIM OF PRIORITY AND RELATED APPLICATIONS

This application claims the benefit of U.S. Provisional Application No. 61/820,731, filed May 8, 2013, the entire contents of which are incorporated herein by reference. This application is related to U.S. Provisional Application No. 61/820,733, filed May 8, 2013, and U.S. application Ser. No. 14/207,280, filed Mar. 12, 2014, the entire contents of which are incorporated herein by reference.

FIELD OF THE INVENTION

The present invention relates to telecommunications networks, and more particularly to sharing resources among users in such networks.

BACKGROUND

Often times, in telecommunications networks, a group of subscribers may be associated with a common subscription plan, which allows members of the group to share resources. For example, a company may have a group plan in which all employees associated with the company share a pool of available network resources. As another example, a family may have a group plan in which all family members are able to share a pool of resources.

Often times, a shared quota is monitored utilizing a quota counter shared with many devices. This results in a huge signaling overhead when there is a quota shared by a large number of devices. There is thus a need for addressing these and/or other issues associated with the prior art.

SUMMARY

A system, method, and computer program product are provided for managing a shared quota for a plurality of network subscribers in a consumer telecommunications network. In use, an Sy interface session is established for a subscriber of a consumer telecommunications network, the Sy interface session being between a Policy and Charging Rules Function (PCRF) node and an Online Charging System (OCS) node of the consumer telecommunications network. Further, it is determined whether the subscriber is associated with any multi-subscriber shared usage counters on the consumer telecommunications network. Responsive to determining that the subscriber is associated with at least one multi-subscriber shared usage counter on the consumer telecommunications network, a reference to the at least one multi-subscriber shared usage counter is provided to the PCRF node by the OCS node. Additionally, the OCS node monitors the at least one multi-subscriber shared usage counter. Responsive to determining that a status of the at least one multi-subscriber shared usage counter has changed, a single Spending Status Notification Request (SNR) message is sent to the PCRF node, the single SNR message notifying the PCRF node that the status of the at least one multi-subscriber shared usage counter has changed. Responsive to the PCRF node receiving the single SNR message notifying the PCRF node that the status of the at least one multi-subscriber shared usage counter has changed, the PCRF node determines which open sessions on the consumer telecommunications network are associated with the at least one multi-subscriber shared usage counter. Furthermore, one or more policy changes to the open sessions are executed in accordance with the change to the at least one multi-subscriber shared usage counter.

DETAILED DESCRIPTION

Figure 1:
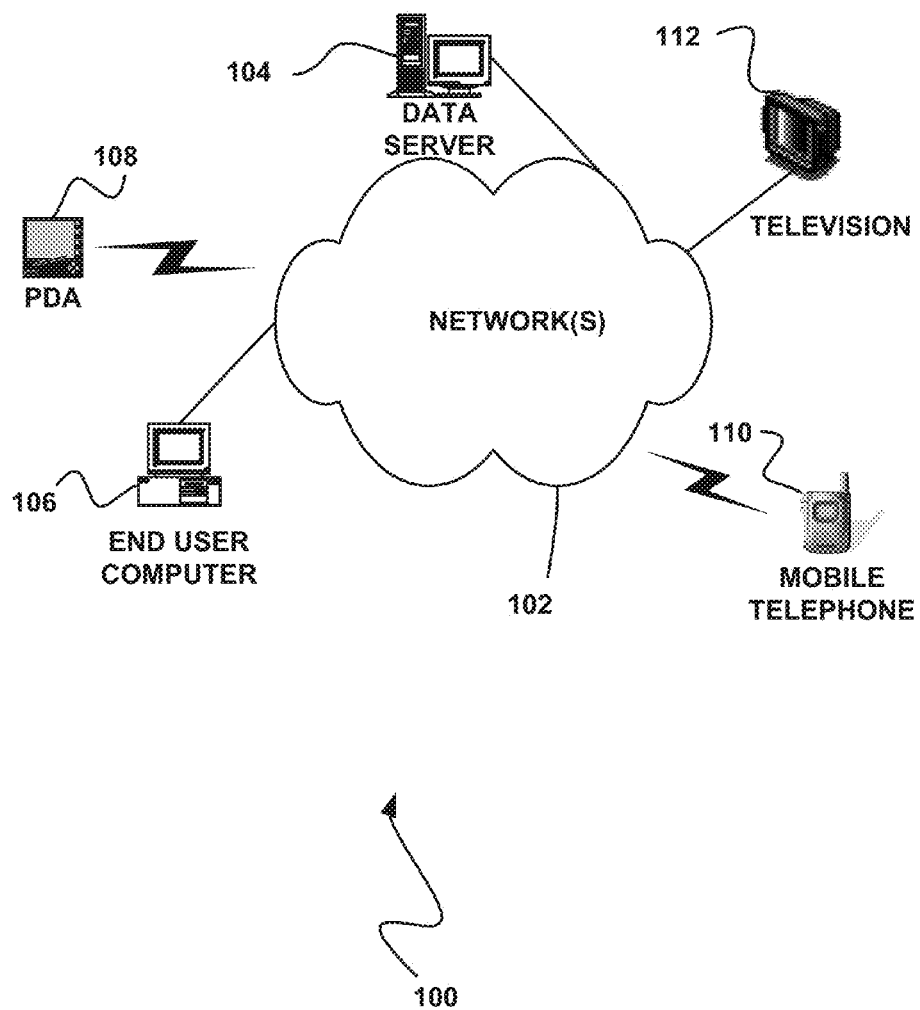
FIG. 1 illustrates a network architecture, in accordance with one possible embodiment.

FIG. 1 illustrates a network architecture 100, in accordance with one possible embodiment. As shown, at least one network 102 is provided. In the context of the present network architecture 100, the network 102 may take any form including, but not limited to a telecommunications network, a local area network (LAN), a wireless network, a wide area network (WAN) such as the Internet, peer-to-peer network, cable network, etc. While only one network is shown, it should be understood that two or more similar or different networks 102 may be provided.

Coupled to the network 102 is a plurality of devices. For example, a server computer 104 and an end user computer 106 may be coupled to the network 102 for communication purposes. Such end user computer 106 may include a desktop computer, lap-top computer, and/or any other type of logic. Still yet, various other devices may be coupled to the network 102 including a personal digital assistant (PDA) device 108, a mobile phone device 110, a television 112, etc.

Figure 2:
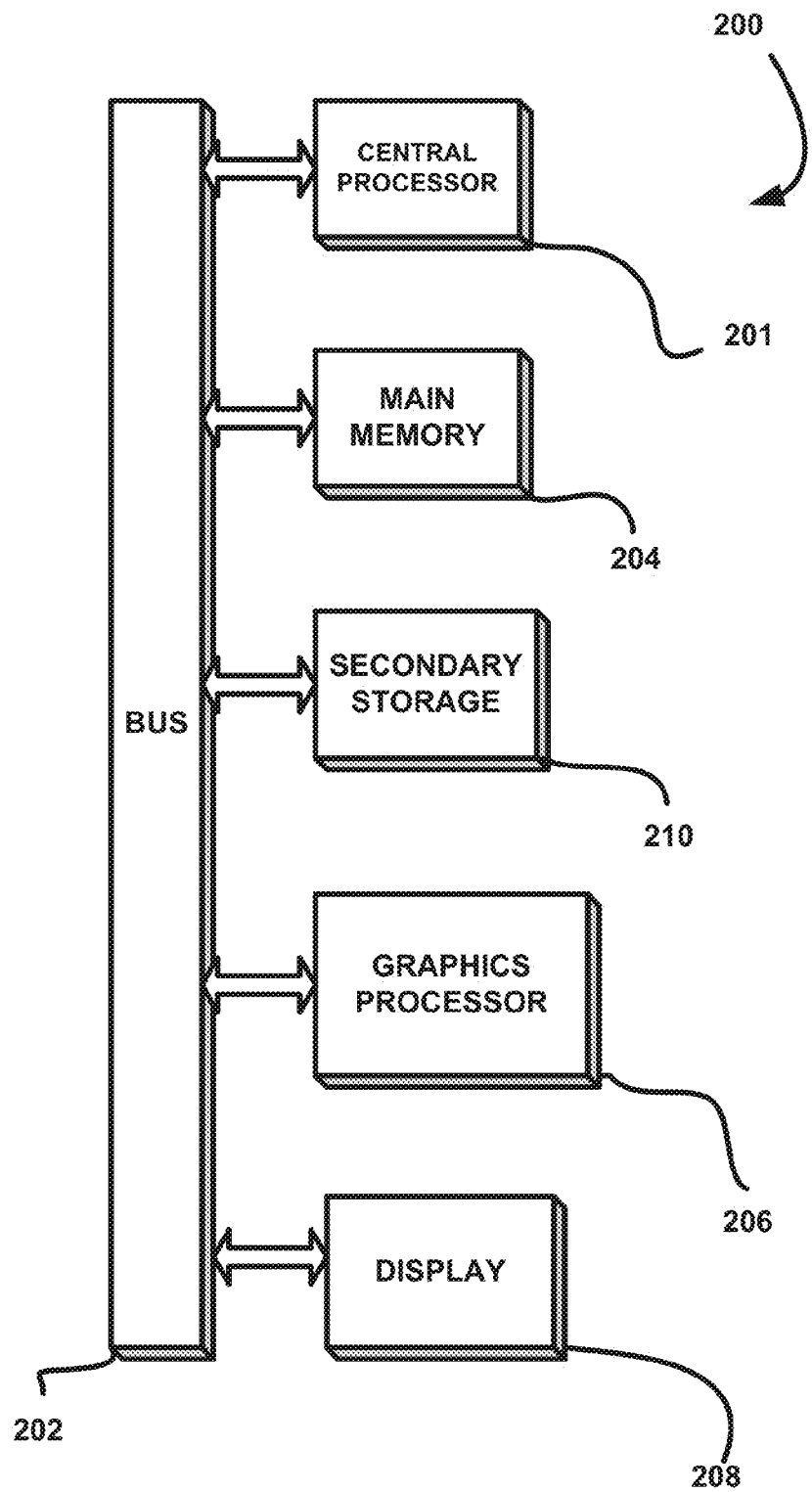
FIG. 2 illustrates an exemplary system, in accordance with one embodiment.

FIG. 2 illustrates an exemplary system 200, in accordance with one embodiment. As an option, the system 200 may be implemented in the context of any of the devices of the network architecture 100 of FIG. 1. Of course, the system 200 may be implemented in any desired environment.

As shown, a system 200 is provided including at least one central processor 201 which is connected to a communication bus 202. The system 200 also includes main memory 204 [e.g. random access memory (RAM), etc.]. The system 200 also includes a graphics processor 206 and a display 208.

The system 200 may also include a secondary storage 210. The secondary storage 210 includes, for example, a hard disk drive and/or a removable storage drive, representing a floppy disk drive, a magnetic tape drive, a compact disk drive, etc. The removable storage drive reads from and/or writes to a removable storage unit in a well known manner.

Computer programs, or computer control logic algorithms, may be stored in the main memory 204, the secondary storage 210, and/or any other memory, for that matter. Such computer programs, when executed, enable the system 200 to perform various functions (to be set forth below, for example). Memory 204, storage 210 and/or any other storage are possible examples of tangible computer-readable media.

Figure 3:
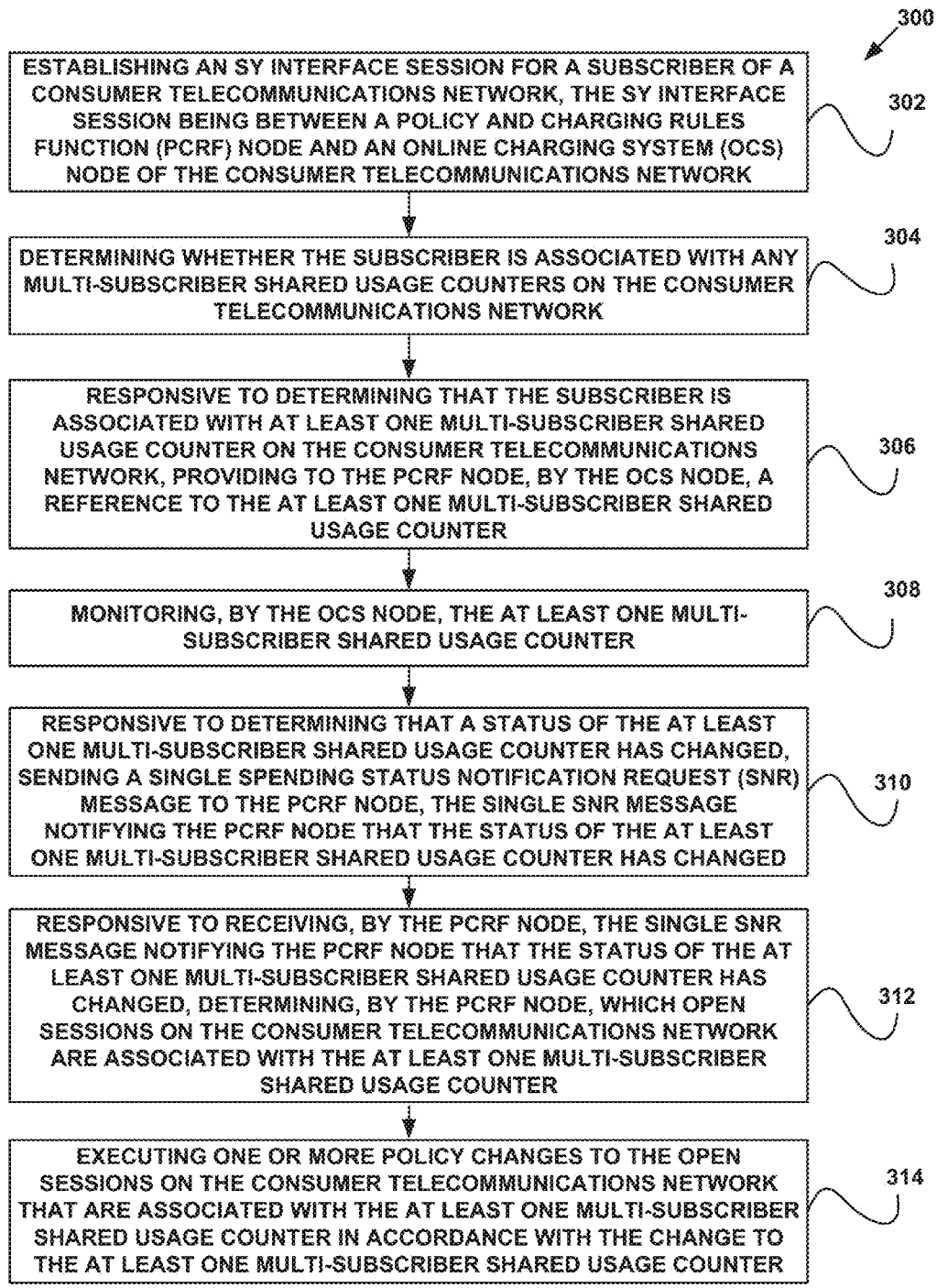
FIG. 3 illustrates a method for managing a shared quota for a plurality of network subscribers in a consumer telecommunications network, in accordance with one embodiment.

FIG. 3 illustrates a method 300 for managing a shared quota for a plurality of network subscribers in a consumer telecommunications network, in accordance with one embodiment. As an option, the method 300 may be carried out in the context of the details of FIGS. 1 and/or 2. Of course, however, the method 300 may be carried out in any desired environment. Further, the aforementioned definitions may equally apply to the description below.

As shown, an Sy interface session is established for a subscriber of a consumer telecommunications network, the Sy interface session being between a Policy and Charging Rules Function (PCRF) node and an Online Charging System (OCS) node of the consumer telecommunications network. See operation 302. The Policy Control and Charging Rules Function (PCRF) node refers to a functional element that encompasses policy control decision and flow based charging control functionalities.

In various embodiments, the PCRF node may take information on the subscriber's spending status into account in its policy decisions. The PCRF node may also request spending limit reporting for policy counters from the OCS node. Additionally, the PCRF node may use the status of each relevant policy counter as input to its policy decision as required by the decision logic.

The OCS node refers to an element that functions to allow a communications service provider to charge customers based on service usage. In various embodiments, the OCS node may maintain policy counter statuses applicable for a subscriber, report the policy counter status values for the subscriber when requested to the PCRF, and/or report changes to the PCRF when a policy counter status changes, etc.

The Sy interface refers to the interface between the PCRF node and the OCS node (e.g. a diameter interface, etc.). The Sy interface may function to enable the transfer of information relating to subscriber spending from the OCS node to the PCRF node.

As shown further in FIG. 3, it is determined whether the subscriber is associated with any multi-subscriber shared usage counters on the consumer telecommunications network. See operation 304.

The multi-subscriber shared usage counter may be associated with any shared quota in the consumer telecommunications network. For example, the at least one multi-subscriber shared usage counter may function to manage a shared quota shared among a plurality of subscribers of the consumer telecommunications network.

In the context of the present description, a shared quota refers to any amount of any type of resource that is reserved for, or allocated to, two or more users of telecommunications network. For example, in one embodiment, the shared quota may include an amount of data allocated to a plurality of subscribers, which the plurality of subscribers may all use. In this case, the data may include an amount of data the subscribers may transfer over a network (e.g. through network use, etc.).

As another example, the shared quota may include an amount of time allocated to a plurality of subscribers, which the plurality of subscribers may all use. In this case, the amount of time may include an amount of minutes available for calls and/or network usage, etc. As another example, the shared quota may include an amount of texts available. For example, the subscribers may be allocated a certain number of short messaging service (SMS) messages and/or multimedia messaging service (MMS) resources.

Responsive to determining that the subscriber is associated with at least one multi-subscriber shared usage counter on the consumer telecommunications network, a reference to the at least one multi-subscriber shared usage counter is provided to the PCRF node by the OCS node. See operation 306.

Additionally, the OCS node monitors the at least one multi-subscriber shared usage counter. See operation 308. In one embodiment, the monitoring of the at least one multi-subscriber shared usage counter may include querying for a status of the multi-subscriber shared usage counter. In another embodiment, the monitoring of the at least one multi-subscriber shared usage counter may include receiving updates of the multi-subscriber shared usage counter.

Responsive to determining that a status of the at least one multi-subscriber shared usage counter has changed, a single Spending Status Notification Request (SNR) message is sent to the PCRF node, the single SNR message notifying the PCRF node that the status of the at least one multi-subscriber shared usage counter has changed. See operation 310. In this case, responsive to determining that the status of the at least one multi-subscriber shared usage counter has changed, the OCS node may send the single SNR message to the PCRF node.

Responsive to the PCRF node receiving the single SNR message notifying the PCRF node that the status of the at least one multi-subscriber shared usage counter has changed, the PCRF node determines which open sessions on the consumer telecommunications network are associated with the at least one multi-subscriber shared usage counter. See operation 312.

Furthermore, one or more policy changes to the open sessions are executed in accordance with the change to the at least one multi-subscriber shared usage counter. See operation 314. The policy changes may include any policy changes, including changes associated with charging, spending, and/or quota allocation, etc.

In one embodiment, the method 300 may further include sending an Sy Spending Limit Request (SLR) to the OCS node. In this case, the PCRF node may send the Sy SLR request to the OCS node (e.g. over the Sy interface). Furthermore, the OCS node may return an Sy Spending Limit Answer (SLA) indicating the status of the at least one multi-subscriber shared usage counter. Additionally, in one embodiment, the OCS node may return an indication of whether the subscriber is associated with any of the multi-subscriber shared usage counters on the consumer telecommunications network.

Utilizing the method 300, in one embodiment, a single quota counter may be shared by multiple devices in a network when the devices are associated with a shared quota (e.g. a shared wallet, etc.).

More illustrative information will now be set forth regarding various optional architectures and uses in which the foregoing method may or may not be implemented, per the desires of the user. It should be strongly noted that the following information is set forth for illustrative purposes and should not be construed as limiting in any manner. Any of the following features may be optionally incorporated with or without the exclusion of other features described.

Figure 4:
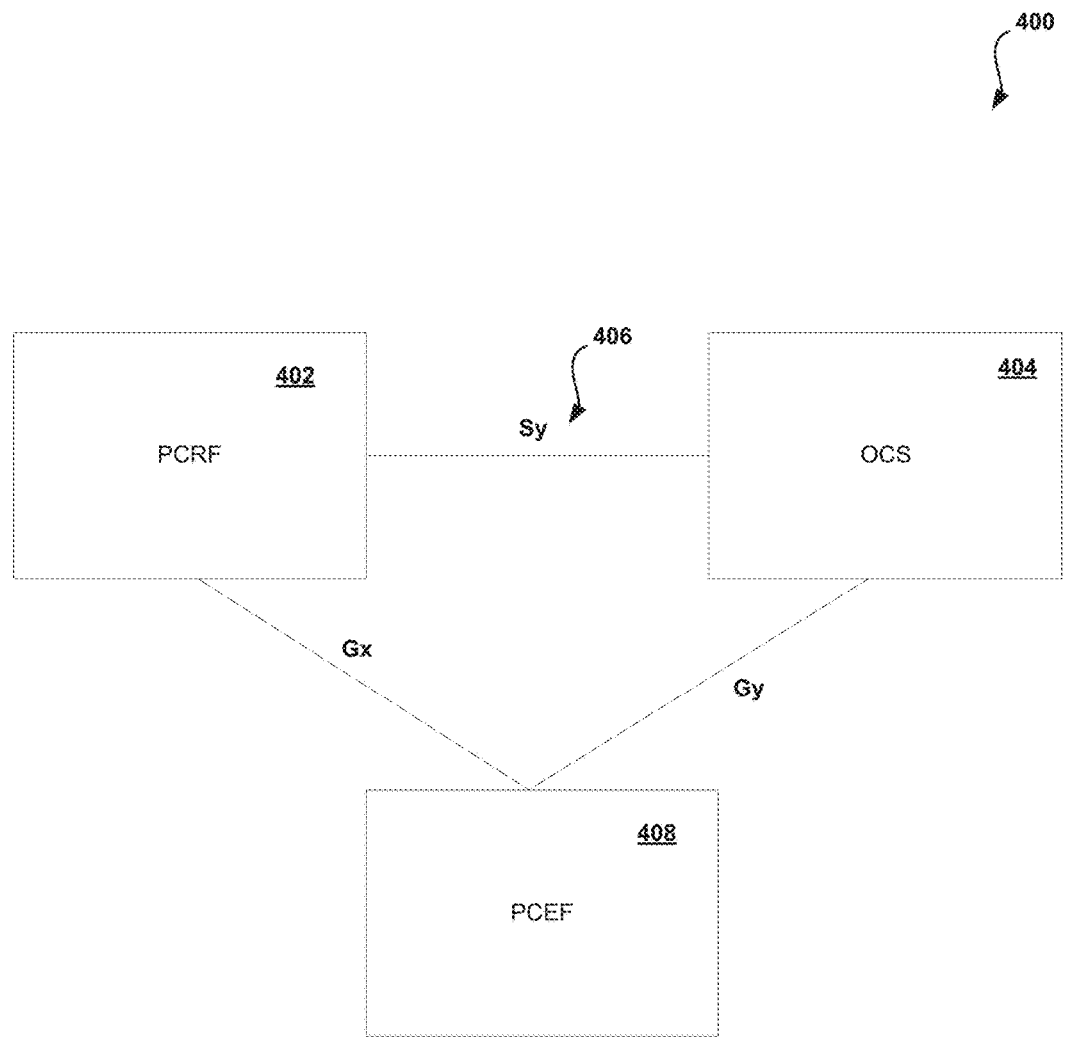
FIG. 4 illustrates a system for managing a shared quota for a plurality of network subscribers in a consumer telecommunications network, in accordance with one embodiment.

FIG. 4 illustrates a system 400 for managing a shared quota for a plurality of network subscribers in a consumer telecommunications network, in accordance with one embodiment. As an option, the system 400 may be implemented in the context of the details of FIGS. 1-3. Of course, however, the system 400 may be implemented in the context of any desired environment. Further, the aforementioned definitions may equally apply to the description below.

FIG. 4 shows a functional block diagram illustrating the interfaces between a Policy and Charging Enforcement Function (PCEF) node 408, a PCRF node 402, and an OCS node 404 in a 3GPP network architecture. In one embodiment, the system 400 may function to allow multiple users/devices in a consumer telecommunications network to share a quota bucket of time and/or volume quota. As shown, the system 400 further includes a 3GPP Sy interface 406.

In operation, the system 400 may function to manage a quota shared among a multiplicity of subscribers of a consumer telecommunications network. For example, responsive to establishing, for a subscriber, an Sy session between the PCRF node 402 and the OCS node 404 via the Sy interface 406, the system 400 may determine whether the subscriber is associated with any multi-subscriber shared usage counters on the network.

In response to determining that the subscriber is associated with at least one multi-subscriber shared usage counter on the network, a reference to the at least one multi-subscriber shared usage counter may be provided to the PCRF node 402 by the OCS node 404. Additionally, the OCS node 404 may monitor the at least one multi-subscriber shared usage counter. In response to ascertaining that the status of the at least one multi-subscriber shared usage counter has changed, a single SNR message may be sent to the PCRF node 402, where the single SNR message notifies the PCRF node 402 that the status of the at least one multi-subscriber shared usage counter has changed.

In response to the PCRF node 402 receiving the single SNR message notifying the PCRF node 402 that the status of the at least one multi-subscriber shared usage counter has changed, the PCRF node 402 may determine which open sessions on the network are associated with the at least one multi-subscriber shared usage counter. The PCRF node 402 may execute policy changes to the open sessions in accordance with the change to at least one multi-subscriber shared usage counter.

Utilizing only a single SNR message functions such that every single subscriber of the shared quota is not required to be notified individually by the OCS node 404 when there is a change to the counter state. Having to notify each subscriber individually would result in a large signaling overhead when there is a quota shared by a large number of devices (e.g. as part of a shared plan for a small or medium sized business, etc.).

Figure 5:
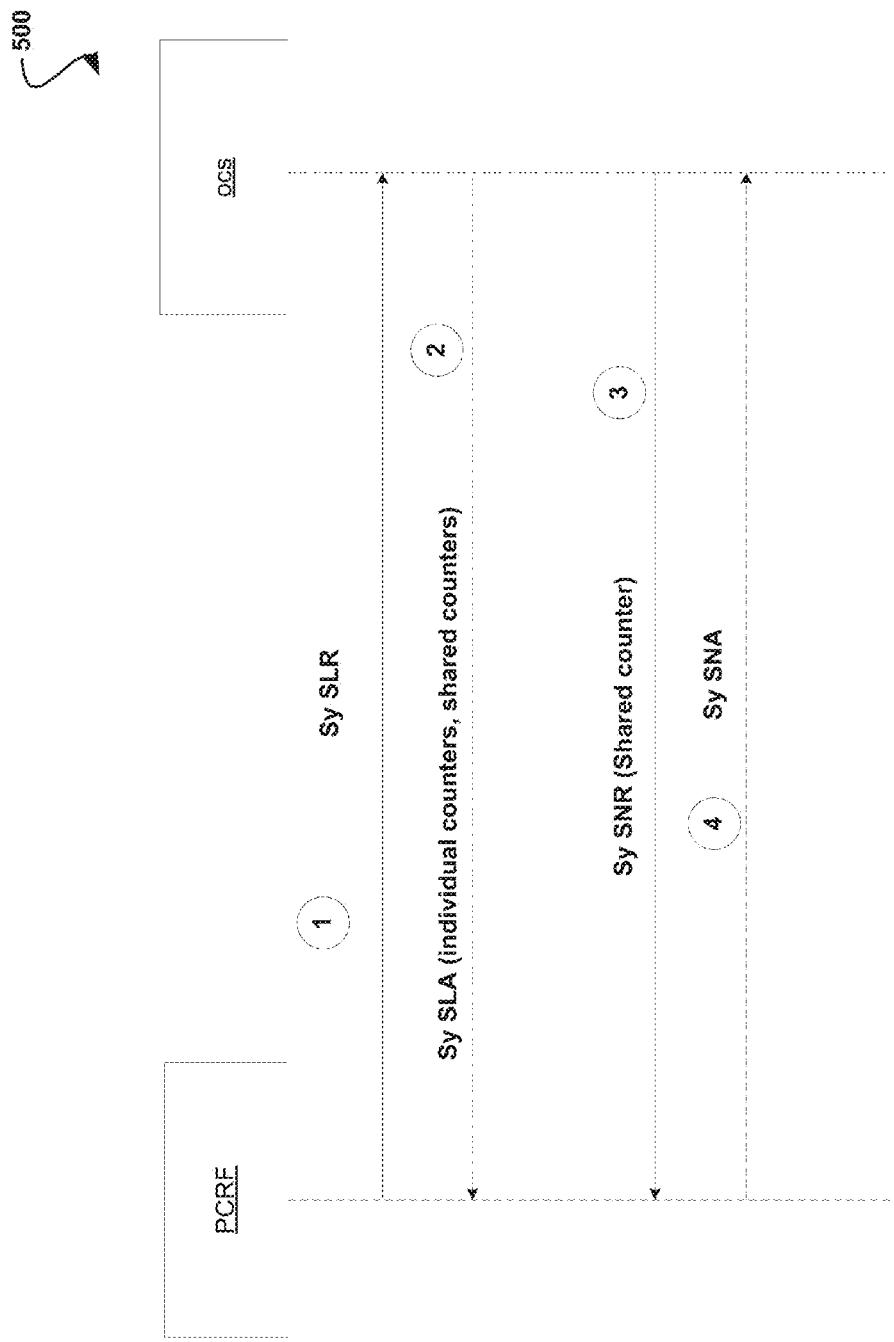
FIG. 5 illustrates a sequence diagram for managing a shared quota for a plurality of network subscribers in a consumer telecommunications network, in accordance with one embodiment.

FIG. 5 illustrates a sequence diagram 500 for managing a shared quota for a plurality of network subscribers in a consumer telecommunications network, in accordance with one embodiment. As an option, the sequence diagram 500 may be implemented in the context of the details of FIGS. 1-4. Of course, however, sequence diagram 500 may be implemented in the context of any desired environment. Further, the aforementioned definitions may equally apply to the description below.

As shown, when an Sy session is established for a subscriber, a PCRF node sends an Sy Spending Limit Request (SLR) to an OCS node. See step 1. The OCS node returns an Sy Spending Limit Answer (SLA) indicating the status of counters for the subscriber. See step 2.

In this case, the OCS node may also return the status of any shared counters associated with the subscriber. Furthermore, the OCS node may indicate that the counter is a shared counter.

When a shared counter status change occurs, the OCS node will only send a single Sy Spending Status Notification Request (SNR) message to the PCRF node. See step 3. The PCRF will then ascertain which effective sessions share the counter and make policy changes as configured. See step 4.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method, comprising:
    establishing an Sy interface session for a subscriber of a consumer telecommunications network, the Sy interface session being between a Policy and Charging Rules Function (PCRF) node and an Online Charging System (OCS) node of the consumer telecommunications network;
    determining whether the subscriber is associated with any multi-subscriber shared usage counters on the consumer telecommunications network;
    responsive to determining that the subscriber is associated with at least one multi-subscriber shared usage counter on the consumer telecommunications network, providing to the PCRF node, by the OCS node, a reference to the at least one multi-subscriber shared usage counter;
    monitoring, by the OCS node, the at least one multi-subscriber shared usage counter;
    responsive to determining that a status of the at least one multi-subscriber shared usage counter has changed, sending a single Spending Status Notification Request (SNR) message to the PCRF node, the single SNR message notifying the PCRF node that the status of the at least one multi-subscriber shared usage counter has changed; and
    responsive to receiving, by the PCRF node, the single SNR message notifying the PCRF node that the status of the at least one multi-subscriber shared usage counter has changed, determining, by the PCRF node, which open sessions on the consumer telecommunications network are associated with the at least one multi-subscriber shared usage counter; and
    executing one or more policy changes to the open sessions on the consumer telecommunications network that are associated with the at least one multi-subscriber shared usage counter in accordance with the change to the at least one multi-subscriber shared usage counter.

2. The method of claim 1, wherein the at least one multi-subscriber shared usage counter function to manage a shared quota shared among a plurality of subscribers of the consumer telecommunications network.

3. The method of claim 2, wherein the shared quota shared among the plurality of subscribers of the consumer telecommunications network includes a quota that is reserved for the plurality of subscribers.

4. The method of claim 2, wherein the shared quota includes a data usage quota associated with the consumer telecommunications network.

5. The method of claim 2, wherein the shared quota includes a time usage quota associated with the consumer telecommunications network.

6. The method of claim 1, further comprising sending an Sy Spending Limit Request (SLR) to the OCS node.

7. The method of claim 6, wherein the PCRF node sends the Sy SLR request to the OCS node.

8. The method of claim 7, wherein the OCS node returns an Sy Spending Limit Answer (SLA) indicating the status of the at least one multi-subscriber shared usage counter.

9. The method of claim 8, wherein the OCS node returns an indication of whether the subscriber is associated with any of the multi-subscriber shared usage counters on the consumer telecommunications network.

10. The method of claim 9, wherein the indication is utilized to determine whether the subscriber is associated with any multi-subscriber shared usage counters on the consumer telecommunications network.

11. The method of claim 1, wherein responsive to determining that the status of the at least one multi-subscriber shared usage counter has changed, the OCS node sends the single SNR message to the PCRF node.

12. A computer program product embodied on a non-transitory computer readable medium, comprising:
   computer code for establishing an Sy interface session for a subscriber of a consumer telecommunications network, the Sy interface session being between a Policy and Charging Rules Function (PCRF) node and an Online Charging System (OCS) node of the consumer telecommunications network;
   computer code for determining whether the subscriber is associated with any multi-subscriber shared usage counters on the consumer telecommunications network;
   computer code for, responsive to determining that the subscriber is associated with at least one multi-subscriber shared usage counter on the consumer telecommunications network, providing to the PCRF node, by the OCS node, a reference to the at least one multi-subscriber shared usage counter;
   computer code for monitoring, by the OCS node, the at least one multi-subscriber shared usage counter;
   computer code for, responsive to determining that a status of the at least one multi-subscriber shared usage counter has changed, sending a single Spending Status Notification Request (SNR) message to the PCRF node, the single SNR message notifying the PCRF node that the status of the at least one multi-subscriber shared usage counter has changed; and
   computer code for, responsive to receiving, by the PCRF node, the single SNR message notifying the PCRF node that the status of the at least one multi-subscriber shared usage counter has changed, determining, by the PCRF node, which open sessions on the consumer telecommunications network are associated with the at least one multi-subscriber shared usage counter; and
   computer code for, executing one or more policy changes to the open sessions on the consumer telecommunications network that are associated with the at least one multi-subscriber shared usage counter in accordance with the change to the at least one multi-subscriber shared usage counter.

13. The computer program product of claim 12, wherein the computer program product is operable such that the at least one multi-subscriber shared usage counter function to manage a shared quota shared among a plurality of subscribers of the consumer telecommunications network.

14. The computer program product of claim 13, wherein the computer program product is operable such that the shared quota shared among the plurality of subscribers of the consumer telecommunications network includes a quota that is reserved for the plurality of subscribers.

15. The computer program product of claim 13, wherein the computer program product is operable such that the shared quota includes a data usage quota associated with the consumer telecommunications network.

16. The computer program product of claim 13, wherein the computer program product is operable such that the shared quota includes a time usage quota associated with the consumer telecommunications network.

17. The computer program product of claim 12, further comprising computer code for sending an Sy Spending Limit Request (SLR) to the OCS node.

18. The computer program product of claim 17, wherein the computer program product is operable such that the PCRF node sends the Sy SLR request to the OCS node.

19. The computer program product of claim 18, wherein the computer program product is operable such that the OCS node returns an Sy Spending Limit Answer (SLA) indicating the status of the at least one multi-subscriber shared usage counter.

20. A system comprising:
   a memory system; and
   one or more processing cores coupled to the memory system and that are each configured to:
      establish an Sy interface session for a subscriber of a consumer telecommunications network, the Sy interface session being between a Policy and Charging Rules Function (PCRF) node and an Online Charging System (OCS) node of the consumer telecommunications network;
      determine whether the subscriber is associated with any multi-subscriber shared usage counters on the consumer telecommunications network;
      responsive to determining that the subscriber is associated with at least one multi-subscriber shared usage counter on the consumer telecommunications network, provide to the PCRF node, by the OCS node, a reference to the at least one multi-subscriber shared usage counter;
      monitor, by the OCS node, the at least one multi-subscriber shared usage counter;
      responsive to determining that a status of the at least one multi-subscriber shared usage counter has changed, send a single Spending Status Notification Request (SNR) message to the PCRF node, the single SNR message notifying the PCRF node that the status of the at least one multi-subscriber shared usage counter has changed; and
      responsive to receiving, by the PCRF node, the single SNR message notifying the PCRF node that the status of the at least one multi-subscriber shared usage counter has changed, determine, by the PCRF node, which open sessions on the consumer telecommunications network are associated with the at least one multi-subscriber shared usage counter; and
      execute one or more policy changes to the open sessions on the consumer telecommunications network that are associated with the at least one multi-subscriber shared usage counter in accordance with the change to the at least one multi-subscriber shared usage counter.

* * * * *